(12) United States Patent
Ruppel et al.

(10) Patent No.: US 12,102,022 B2
(45) Date of Patent: Oct. 1, 2024

(54) DUAL-DIRECTION TILLER/CULTIVATOR

(71) Applicant: ARDISAM, INC., Cumberland, WI (US)

(72) Inventors: Robert John Ruppel, Cumberland, WI (US); Matthew Michael Oestreich, Cumberland, WI (US); Noah William Marach, Rice Lake, WI (US)

(73) Assignee: ARDISAM, INC., Cumberland, WI (US)

( * ) Notice: Subject to any disclaimer, the term of this patent is extended or adjusted under 35 U.S.C. 154(b) by 1314 days.

(21) Appl. No.: 16/725,657

(22) Filed: Dec. 23, 2019

(65) Prior Publication Data
US 2021/0185873 A1 Jun. 24, 2021

(51) Int. Cl.
*A01B 33/08* (2006.01)
*A01B 33/02* (2006.01)
*F16H 1/06* (2006.01)

(52) U.S. Cl.
CPC .......... *A01B 33/082* (2013.01); *A01B 33/021* (2013.01); *F16H 1/06* (2013.01); *F16H 2712/10* (2013.01)

(58) Field of Classification Search
CPC ... A01B 33/028; A01B 33/082; A01B 33/021; A01B 33/16; F16H 1/06; F16H 2712/10
See application file for complete search history.

(56) References Cited

U.S. PATENT DOCUMENTS

| | | | | |
|---|---|---|---|---|
| 2,049,661 A | * | 8/1936 | Dines ..................... | B62D 51/06 74/354 |
| 2,989,127 A | * | 6/1961 | Oertle, Jr. ............ | B62D 51/004 172/103 |
| 4,519,459 A | * | 5/1985 | Reaume ................ | B62D 51/06 192/21 |

(Continued)

FOREIGN PATENT DOCUMENTS

| | | |
|---|---|---|
| EP | 1619422 B1 | 5/2007 |
| EP | 1965101 B1 | 9/2013 |

OTHER PUBLICATIONS

Alibaba, "motorcycle gear shift drum and cnc motorcycle parts", Available at https://www.alibaba.com/product-detail/motorcycle-gear-shift-drum-and-cnc_60451178206.html. Exact publication date unknown; site visited Apr. 23, 2020.

(Continued)

*Primary Examiner* — Jessica H Lutz
(74) *Attorney, Agent, or Firm* — Perkins Coie LLP

(57) ABSTRACT

A driveline assembly for equipment, such as a tiller, includes a pair of counter-rotating bevel gears supported on a wheel shaft and rotatable relative to the wheel shaft. The driveline assembly includes a first slider gear movable between a first position in which the first slider gear is engaged with a first bevel gear of the pair of bevel gears, and a second position in which the first slider gear is engaged with a second bevel gear of the pair of bevel gears. When the first slider gear is engaged with the first bevel gear, the first bevel gear becomes operatively connected to a rotatable tine shaft to (Continued)

rotate tines in a first direction. When the first slider gear is engaged with the second bevel gear, the second bevel gear becomes operatively connected to the rotatable tine shaft to rotate the tines in a second direction opposite the first direction.

18 Claims, 12 Drawing Sheets

(56) References Cited

U.S. PATENT DOCUMENTS

| | | | | |
|---|---|---|---|---|
| 4,567,949 | A | * | 2/1986 | Herscher .............. A01B 33/082 |
| | | | | 180/19.1 |
| 6,308,797 | B1 | | 10/2001 | Hacker et al. |
| 7,197,954 | B2 | | 4/2007 | Baldascini et al. |
| 8,276,473 | B2 | * | 10/2012 | Kobayashi ............. B60K 20/04 |
| | | | | 74/473.25 |
| 8,291,991 | B1 | * | 10/2012 | Cook ...................... A01B 45/02 |
| | | | | 172/125 |
| 8,429,993 | B2 | | 4/2013 | Garabello et al. |
| 8,447,478 | B2 | | 5/2013 | Garabello et al. |
| 8,733,477 | B1 | * | 5/2014 | Cook ...................... A01B 45/02 |
| | | | | 180/6.32 |
| 9,027,430 | B2 | * | 5/2015 | Mitsubori ............... F16H 61/26 |
| | | | | 74/473.36 |
| 9,615,510 | B2 | * | 4/2017 | Sirek ...................... A01D 43/00 |
| 9,924,622 | B2 | * | 3/2018 | Maggard .............. A01B 33/028 |
| 10,779,455 | B1 | * | 9/2020 | Cook ...................... A01B 76/00 |
| 2014/0083228 | A1 | | 3/2014 | Mitsubori et al. |

OTHER PUBLICATIONS

Aliexpress, "Gear Shift Drum Transmission for Motorcycle", ZS177MM Zongshen Engine NC250 KAYO T6 BSE J5 RX3 ZS250GY-3 4 Valves Parts, available at https://www.aliexpress.com/item/32831368285.html. Exact publication date unknown; site visited Apr. 23, 2020.

CT Assets, "Replace the tiller transmission", Available at https://images.ctfassets.net/fpe0ec7r30ix/21ZnAG30jRy1iurSDZWMe6/22cf2fc7c12e4466e3a608f3e00c4a29/JC-TIL-Replace-the-tiller-transmission.jpg?w=250&h=250. Exact publication date unknown; site visited Apr. 23, 2020.

Dan's Motorcycle, "Gear Shifters", Available at http://www.dansmc.com/gearshifters.htm. Exact publication date unknown; site visited Apr. 23, 2020.

Davis Hans, S.J., "Sliding Mesh Gear Box", Design of Transmission Systems, available at https://sites.google.com/site/designoftransmissionsystems/Design-of-Gear-Boxes/sliding-mesh-gear-box. Exact publication date unknown; site visited Apr. 23, 2020.

Ebay, "79 Honda CB 750 CB750K Four Motorcycle Transmission Shift Drum", Available at https://www.ebay.com/itm/79-HONDA-CB-750-CB750K-FOUR-MOTORCYCLE-TRANSMISSION-SHIFT-DRUM-/270818928056. Exact publication date unknown; site visited Apr. 23, 2020.

Ebay, "82 1982 Kawasaki KX80 KX 80 Bike Motorcycle Shift Drum Worm Shifter Engine", Available at https://www.ebay.com/itm/82-1982-KAWASAKI-KX80-KX-80-BIKE-MOTORCYCLE-SHIFT-DRUM-WORM-SHIFTER-ENGINE-/161430945455. Exact publication date unknown; site visited Apr. 23, 2020.

Home Depot, "Cub Cadet", Available at https://www.homedepot.com/p/ugc?itemId=203445596. Exact publication unknown; site visited Apr. 23, 2020.

How It Works Daily, "How do differential gears work", Available at https://www.howitworksdaily.com/how-do-differential-gears-work/. Jul. 14, 2016.

Jack's Small Engines, "MTD 215-410-131 (1995) Gear case assembly parts diagram", https://www.jackssmallengines.com/jacks-parts-lookup/manufacturer/cub-cadet/huskee-husky/21-tillers/1995-models/215-410-131-1995/gear-case-assembly. Exact publication unknown; site visited Apr. 23, 2020.

Lowe's, "Husqvarna DRT900H 160-cc 17-in Rear-Tine Dual-rotating Tiller", Available at https://www.lowes.com/pd/Husqvarna-DRT900H-160-cc-17-in-Rear-Tine-Dual-rotating-Tiller-CARB/4326485. Exact publication date unknown; site visited Apr. 23, 2020.

RRR Tool Solutions, "Motorcycle Transmission—How and Why It Works", Available at http://www.rrrtoolsolutions.com/articles/motorcycle-transmission-how-and-why-it-works/. Exact publication date unknown; site visited Apr. 23, 2020.

RRR Tool Solutions, "Shift-Drum-Channels-Fork-Control", Available at http://www.rrrtoolsolutions.com/articles/motorcycle-transmission-how-and-why-it-works/shift-drum-channels-fork-control/. Published Oct. 12, 2016. Site visited Apr. 23, 2020.

Shutterstock, "Shift drum for a motorcycle race gearbox", Available at https://www.shutterstock.com/image-photo/shift-drum-motorcycle-race-gearbox-752036905. Exact publication date unknown; site visited Apr. 23, 2020.

Tractor Supply, "Cub Cadet RT 65 Dual Direction 18 in. Rear-Tine Tiller", Available at https://www.tractorsupply.com/tsc/product/cub-cadet-rt-65-dual-direction-18-in-rear-tine-tiller. Exact publication date unknown; site visited Apr. 23, 2020.

Wikipedia, "Gear train", Available at https://en.wikipedia.org/wiki/Gear_train. Exact publication date unknown; site visited Apr. 23, 2020.

Youtube, "How an Evinrude gearbox works—outboard gear shifting—forward / reverse", Available at https://www.youtube.com/watch?v=9ib2OkytCBs. Dec. 24, 2017.

\* cited by examiner

DUAL-DIRECTION TILLER/CULTIVATOR

BACKGROUND

Fertile soil is the foundation to any lawn or garden project. Vegetable gardens, planting beds, and grasses need rich, loose, drainable soil to ensure root growth and abundant crops. Successful planting typically involves properly preparing the soil with a cultivator or tiller. Finding the right tiller depends on the soil type, the size of the subject garden, the garden layout, and whether a new garden is being created or whether the soil needs to be tilled in an existing garden. Rear-tine tillers (in which the tines are positioned toward the rear of the machine, for example, between the user and the motor or engine) are helpful for creating gardens in which the soil is tough, or a layer of sod covers the ground.

For a rear-tine tiller to perform well, the transmission should be narrow, the center of gravity of the tiller should be as low to the ground as possible while maintaining adequate ground clearance, the tiller should be balanced about the wheel axle front to back, and the tiller should be balanced about the centerline side to side. Existing rear-tine tillers are inadequately balanced and have undesirably high centers of gravity, in part due to their reliance on old transmission and driveline arrangements.

For breaking ground, it may be advantageous for the tines to rotate opposite to the rotational direction of the wheels, an arrangement commonly described as "Counter Rotating Tines" ("CRT"). For cultivating already tilled soil, it may be advantageous for the tines to rotate in the same direction as the rotational direction of the wheels (or other rotational propulsion, such as tracks), an arrangement commonly described as "Standard Rotating Tines" ("SRT"). A tiller having both a CRT mode and an SRT mode may be described as having "Dual Direction Tines" ("DDT"), such that a DDT tiller's tines rotate in either the same direction as, or the opposite direction to, the rotational direction of the wheels, depending on the selected mode.

For example, a DDT tiller can counter-rotate the tines (CRT mode) to break sod and to break untilled ground. After the sod is broken, or in previously tilled ground, some tillers may not be sufficiently heavy for the rotational propulsion (wheels) to gain traction sufficient to overcome the force of the counter-rotating tines in CRT mode. Accordingly, a DDT tiller can also rotate the tines in the same direction as the rotational direction of the wheels (SRT mode) to help propel the tiller across the workspace.

Conventional DDT tillers may have five general modes of operation, depending on the rotation of the wheels, the rotation of the tines, and whether the tines or the wheels are powered: (1) wheels forward/tines forward; (2) wheels forward/tines reverse; (3) wheels forward/tines neutral (tines not powered); (4) wheels neutral (wheels not powered)/tines neutral (tines not powered); (5) wheels reverse/tines neutral (tines not powered). In order to achieve these modes, conventional DDT tillers require transmissions with many parts, which contribute to conventional DDT tillers being top-heavy and side-heavy.

A conventional rear-tine tiller with DDT function positions the heavy and complicated transmission parts in the center of the machine above the tine and wheel-drive sprockets. In other words, the input shaft is at the top, the shifting gears, drive sprockets, and other gears are in the middle, and the driven sprockets and output shafts are on the bottom. This arrangement of power transmission (gearing and shafting) causes the machine to have a high center of gravity because the heavy gear sprockets and housing are on the top of the power transmission pyramid.

In an attempt to produce a compact package and minimize material costs of the machine, the engine in a conventional rear-tine tiller with DDT function may be positioned as close as possible to the transmission and wheels. However, placing the engine (more specifically, the engine flywheel) close to the machine's propulsion wheels may result in balance problems that often are resolved by adding extra weight to balance the machine properly (and weights may be added for other reasons). Additional weight is undesirable as it increases cost and decreases efficiency.

Existing rear-tine tillers with DDT function may have a high center of gravity because the transmission center of gravity is high and the engine center of gravity is high, so the tiller is susceptible to tipping. In addition, if a tiller's weight distribution is such that there is too much weight on the tines, as opposed to the wheels (or other propulsion devices), the tiller may perform poorly in CRT mode due to reduced traction. In SRT mode, the tines of such a tiller will have a tendency to propel the unit forward regardless of the speed of the wheels due to low traction on the wheels. Existing DDT tillers are not only top heavy but are also heavy to the side of the engine flywheel and transmission bulge. Accordingly, while in operation, existing units typically tip toward the flywheel/transmission bulge side. To compensate for this unequal weight distribution, existing DDT tillers include additional weight positioned toward the front of the machine and opposite the transmission bulge. But this additional weight increases cost and complexity.

What is needed is a rear-tine tiller with dual-direction tines (DDT function) that overcomes the foregoing issues presented by conventional rear-tine tillers.

SUMMARY

A driveline assembly for agricultural equipment, such as a tiller, may include a pair of counter-rotating bevel gears supported on a wheel shaft and rotatable relative to the wheel shaft. The driveline assembly includes a first slider gear movable between a first position in which the first slider gear is engaged with a first bevel gear of the pair of bevel gears, and a second position in which the first slider gear is engaged with a second bevel gear of the pair of bevel gears. When the first slider gear is engaged with the first bevel gear, the first bevel gear becomes operatively connected to a rotatable tine shaft to rotate tines in a first direction. When the first slider gear is engaged with the second bevel gear, the second bevel gear becomes operatively connected to the rotatable tine shaft to rotate the tines in a second direction opposite the first direction.

Representative embodiments of the present technology address several problems with conventional tillers. For example, representative embodiments of the present technology lower the center of gravity of the transmission, orient the engine and the transmission to balance the overall tiller from side to side, and position components (such as the high torque gears and flywheel) toward the front of the machine to balance the machine without including the additional weight relied on by conventional tillers.

Thus, in some embodiments of the present technology, the centers of gravity of the transmission, the tiller, and the engine are lowered, and the driveline is simplified by making the input shaft axis intersect the wheel shaft axis.

In some embodiments of the present technology, the driveline direction is parallel to the engine rather than parallel to the output shaft while also reducing the speed output from the engine.

In some embodiments of the present technology, two directions of rotation are gained by utilizing a single bevel pinion contacting two beveled plate gears.

In some embodiments of the present technology, the center of gravity of the driveline is lowered and the driveline is simplified by positioning the input shaft axis below the tine and wheel driver sprocket axis.

In some embodiments of the present technology, the center of gravity of the driveline is lowered and the driveline is simplified by using the wheel shaft as a plate gear idler shaft.

In some embodiments of the present technology, the tiller is balanced side to side by positioning the engine flywheel on the centerline of the machine and keeping the driveline symmetrical about the centerline of the tiller.

In some embodiments of the present technology, a bevel gear arrangement is provided wherein a pinion shaft drives one or more beveled plate gears and the shaft on which the beveled plate gears is located does not spin at the same speed as the plate gears, yet is a driven shaft in the same driveline.

In some embodiments of the present technology, a bevel gear arrangement is provided, wherein the plate gear rotates in a direction opposite to the direction of the shaft about which it rotates.

In some embodiments of the present technology, the rotational (angular) velocity of the shaft supporting the bevel gears is always less than the rotational (angular) velocity of the bevel gears, which idle on the shaft.

In some embodiments of the present technology, a shift drum has an enlarged radius relative to a diameter of the shaft that supports it (such as a pivot shaft). For example, the radius of the shift drum may be two or more times the radius of the shaft that supports it, or three or more times the radius of the shaft that supports it.

In some embodiments of the present technology, a shift drum is actuated by a lever that is mechanically fastened to the shift drum without relative movement between the lever and the shift drum.

Other features and advantages will appear hereinafter. The features described above and below can be used separately or together, or in various combinations of one or more of them.

BRIEF DESCRIPTION OF THE DRAWINGS

Many aspects of the present technology are better understood with reference to the following drawings. The components in the drawings are not necessarily to scale. Instead, emphasis is placed on clearly illustrating the principles of the present technology.

In the drawings, wherein the same reference number indicates the same element throughout the views.

DETAILED DESCRIPTION

The present technology is directed to dual-direction, rear-tine tillers/cultivators (such as rototillers), and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions, such as structures or functions common to tillers, cultivators, engines, or transmissions, may not be shown or described in detail so as to avoid unnecessarily obscuring the relevant description of the various embodiments. Accordingly, embodiments of the present technology may include additional elements or exclude some of the elements described below with reference to FIGS. 1-11, which illustrate examples of the technology.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components. The term "operatively connected" includes direct or indirect connections that facilitate a functional relationship.

Specific details of several embodiments of the present technology are described herein with reference to tillers. For convenience, reference may be made to "tillers," however, for the purposes of implementing embodiments of the present technology, it is understood that cultivators are included in the term "tillers" and are an example of "tillers." Furthermore, the present technology may be used in other agricultural machines (including machines for gardening or yardwork). For example, the present technology may also be used with other machines that involve rotating implements (tines, reels, or other rotating implements) for stirring soil or other earthen material, or for cutting or grinding objects, such as harvesters, edgers, or other agricultural machines.

Figure 1:
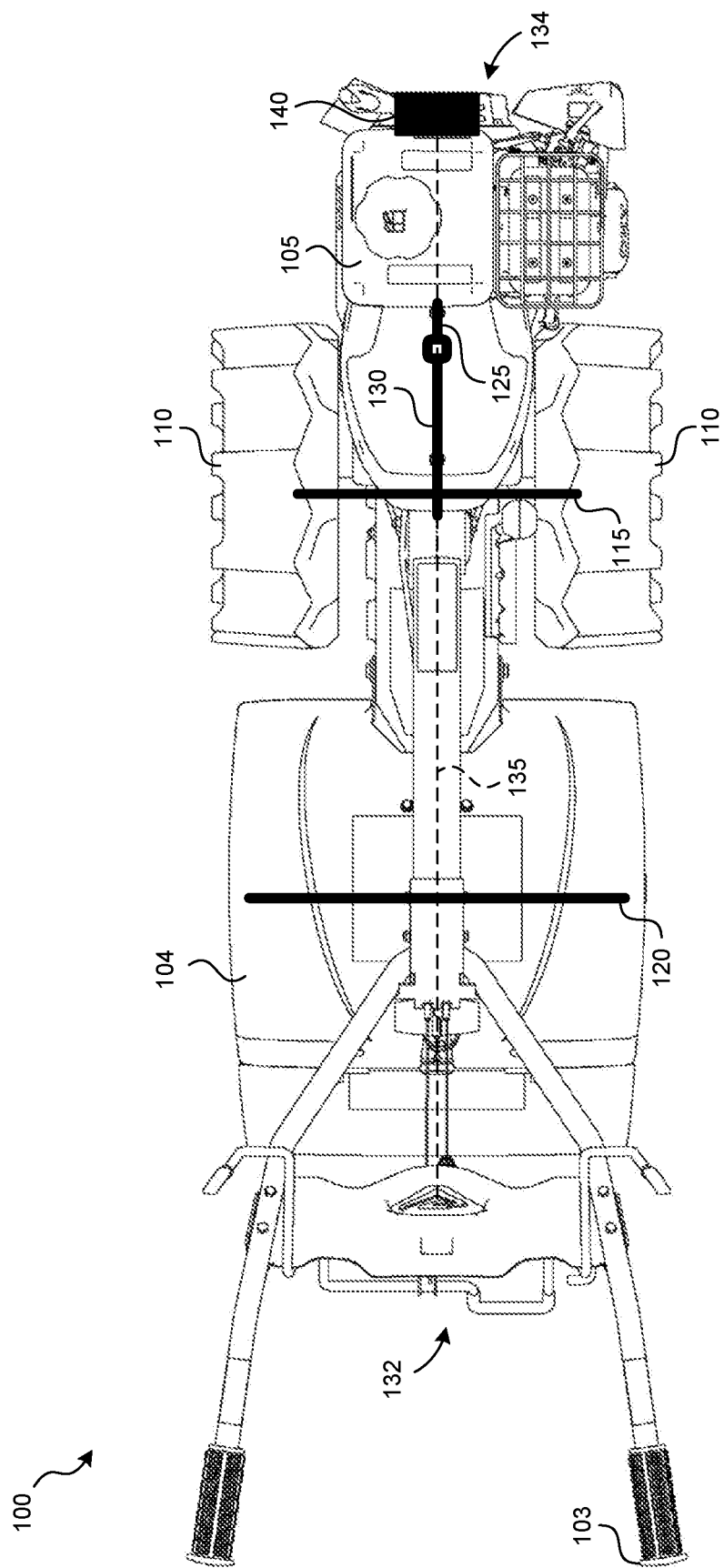
FIG. 1 illustrates a schematic top view of a tiller configured in accordance with embodiments of the present technology.

Turning now to the drawings, FIG. 1 illustrates a schematic top view of a tiller 100 configured in accordance with embodiments of the present technology. The tiller 100 may have handles 103 for a user to manipulate the tiller, and the handles 103 may have suitable controls for operating various propulsive operations or tilling operations. The tiller 100 may include a number of tines, which may be under a protective shield 104 (to protect a user from the tines or from debris generated by the tines during operation). The tiller 100 includes a motor 105, which may include a combustion engine or an electric motor, or a combination of combustion engine and electric motor. The motor 105 provides a rotational force to drive the tines and one or more rotational propulsive devices 110, which may include wheels or tracks.

The propulsive devices 110 (which will be referred to as wheels 110 herein for convenience) propel the tiller 100 across a working surface (or allow a user to push the tiller 100 if the wheels 110 are in an unpowered neutral mode) while the tines operate to cultivate, till, or perform other functions. A wheel shaft 115 may form the wheel axis to rotate the wheels 110. The wheel shaft 115 may facilitate rotation of the wheels 110 at the same speed and in the same direction. In some embodiments, the wheel shaft 115 may include a continuous shaft (for example, a shaft formed from multiple pieces fixed together to form a continuous shaft, or a single integral shaft) extending from one wheel 110 to the other wheel 110. For example, the continuous wheel shaft 115 may be formed in multiple pieces fixed together such that the pieces (and the wheels) rotate together (at the same speed) and do not rotate relative to each other, or the continuous wheel shaft 115 may be formed with a single integral shaft such that the wheels rotate together (at the same speed) and do not rotate relative to each other.

A tine shaft 120 may carry or support the tines to rotate the tines thereon. The motor 105 may have an output shaft 125 that is suitably connected to a driveline input shaft 130 to provide rotational force to the driveline input shaft 130. The driveline input shaft 130 provides rotation to the various mechanical components (gears, shafts, etc.) that are operatively connected with one another to rotate the wheels 110 and the tines to propel the tiller 100 and to perform the tilling/cultivating functions. In some embodiments, as illustrated, the tiller 100 may be a rear-tine tiller, which generally means that the tines are positioned toward the user (rear) side 132 of the tiller 100, for example, between the user and the wheels 110.

According to embodiments of the present technology, the tiller 100 may be generally weight-balanced from side to side by positioning components along a centerline 135 or symmetrically relative to the centerline 135. For example, the motor 105 may include a flywheel 140 positioned so that its rotational axis is parallel to the centerline 135 and positioned on, above, or below the centerline 135. The tiller 100 may be generally weight-balanced between the rear side 132 and the front (forward) side 134 about the wheel shaft 115.

Figure 2:
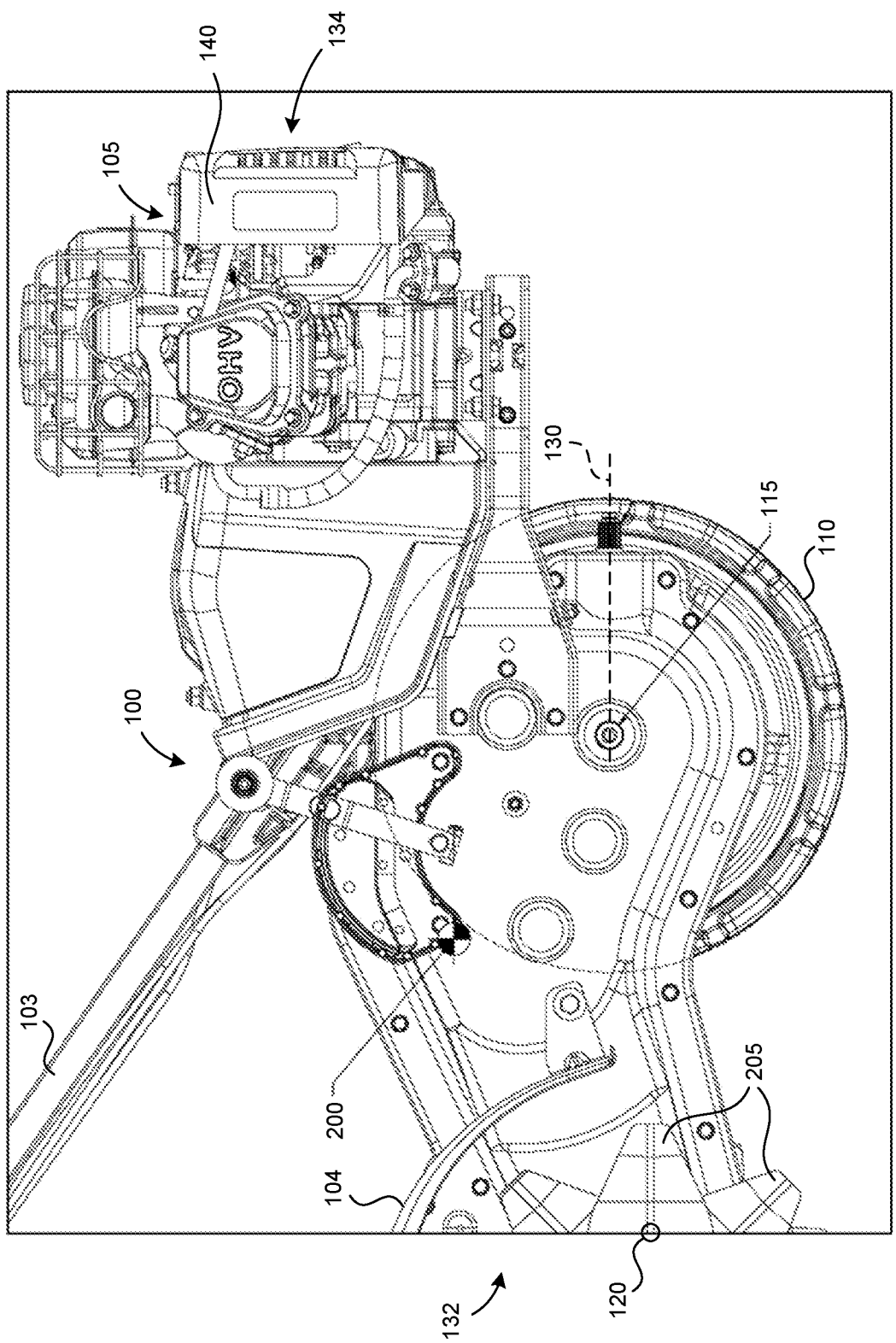
FIG. 2 is a schematic side view of a lower portion of the tiller illustrated in FIG. 1, depicting a generally low center of gravity of the tiller.

FIG. 2 is a schematic side view of the tiller 100 illustrated in FIG. 1, depicting a generally low center of gravity 200 of the tiller 100, resulting in part from positioning several of the driveline components in accordance with embodiments of the present technology. For example, in some embodiments, the rotational axis of the driveline input shaft 130 may intersect the rotational axis of the wheel shaft 115 (which extends in and out of the sheet on which FIG. 2 is presented), thereby positioning the input shaft axis on the same horizontal plane as the wheel shaft. The center of gravity 200 may also be lowered and positioned closer to the axis of the wheel shaft 115 by positioning a substantial amount (such as most) of the weight of the driveline components on the wheel shaft 115 itself. Positioning most of the weight of the driveline components on the wheel shaft 115 enhances traction at the wheels 110. FIG. 2 also illustrates some of the tines 205 carried by the tine shaft 120.

Weight-balancing and low positioning of the center of gravity may be accomplished by various embodiments of the present technology, as described in additional detail below. For example, embodiments of the present technology include a gear arrangement for positioning weight on the tiller wheel shaft 115, a shift drum for selecting between various modes (e.g., SRT, CRT, etc.) of a DDT tiller, and a lever fixed to the shift drum for providing efficient operation of the shift drum when a user selects the various modes of a DDT tiller configured in accordance with embodiments of the present technology.

Gear Arrangement for Positioning Weight on Tiller Wheel Shaft

Figure 3:
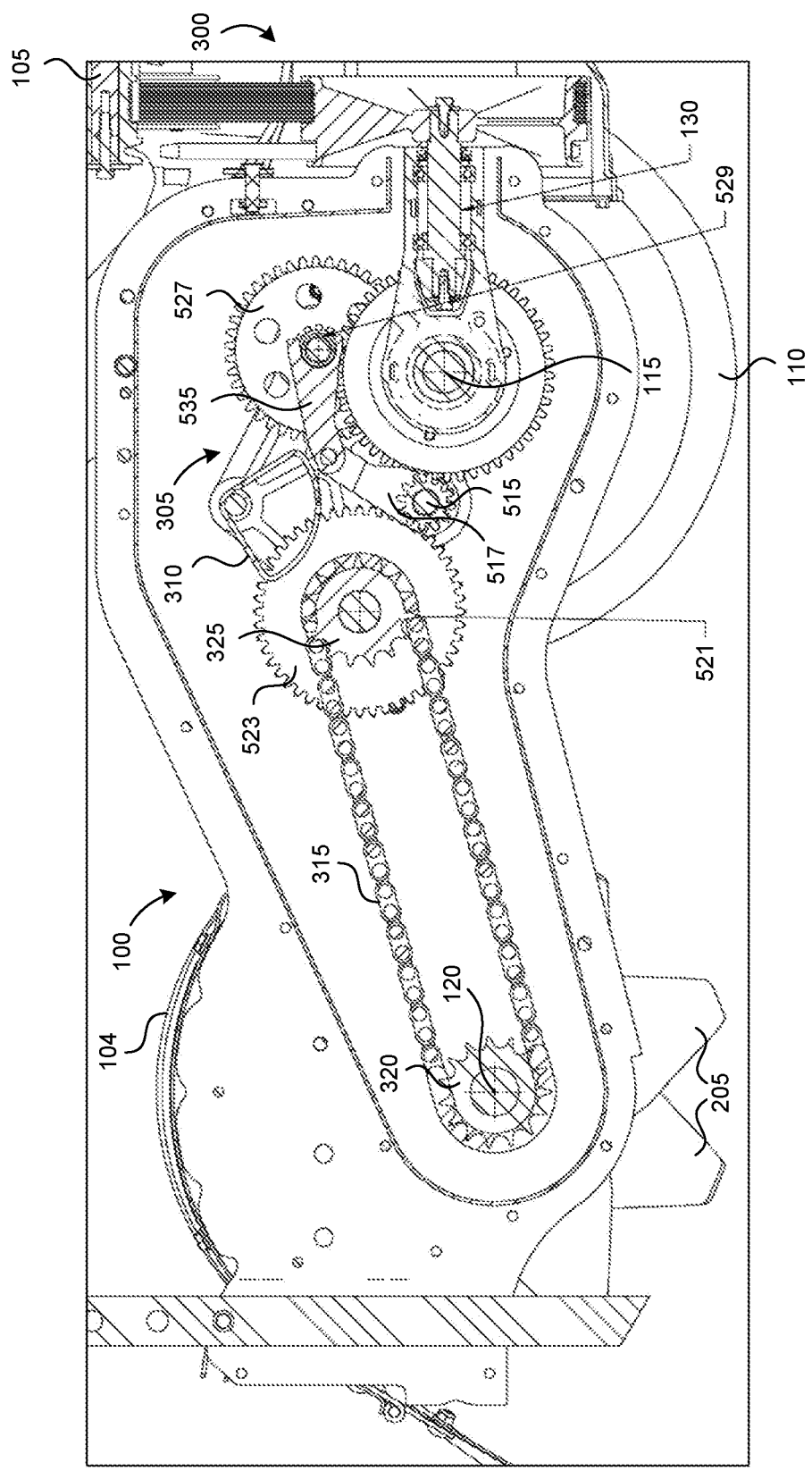
FIG. 3 illustrates a schematic side view of a portion of the tiller illustrated in FIG. 1.

FIG. 3 illustrates a schematic side view of a portion of the tiller 100 illustrated in FIG. 1. The motor 105 (which is only partially shown) provides rotational force to the input shaft 130 via any suitable mechanism, such as a direct connection to the motor 105 output, or a geared connection between the motor 105 output and the input shaft 130, or, as shown, a belt and pulley system 300. The input shaft 130 may receive rotational force to rotate the input shaft 130 about its axis (see FIG. 2) in a first direction and in a second direction that is opposite the first direction. In some embodiments, the belt and pulley system or other suitable connection between the motor 105 and the input shaft 130 facilitates selection between the first direction and the second direction. In other embodiments, the motor 105 itself may have reversible output. In some embodiments, the source of rotational force applied to the input shaft 130 may not be reversible and may only provide rotational force in one direction to the input shaft 130 (in such a case, the wheels 110 would be powered in only one direction when using the driveline assembly 305 described below).

The input shaft 130 is the input to a driveline assembly 305, according to embodiments of the present technology. The driveline assembly 305 selectively transfers rotational forces from the input shaft 130 to the wheel shaft 115 and the tine shaft 120. For example, the driveline assembly 305 includes gearing and a movable shift drum 310 that facilitates selection between multiple modes of operation of the tiller 100 (e.g., CRT mode and SRT mode), as explained in additional detail below. In some embodiments, the driveline assembly 305 may be connected to the tine shaft 120 via a chain 315, a tine input sprocket 320, and a tine output sprocket 325.

Figure 4:
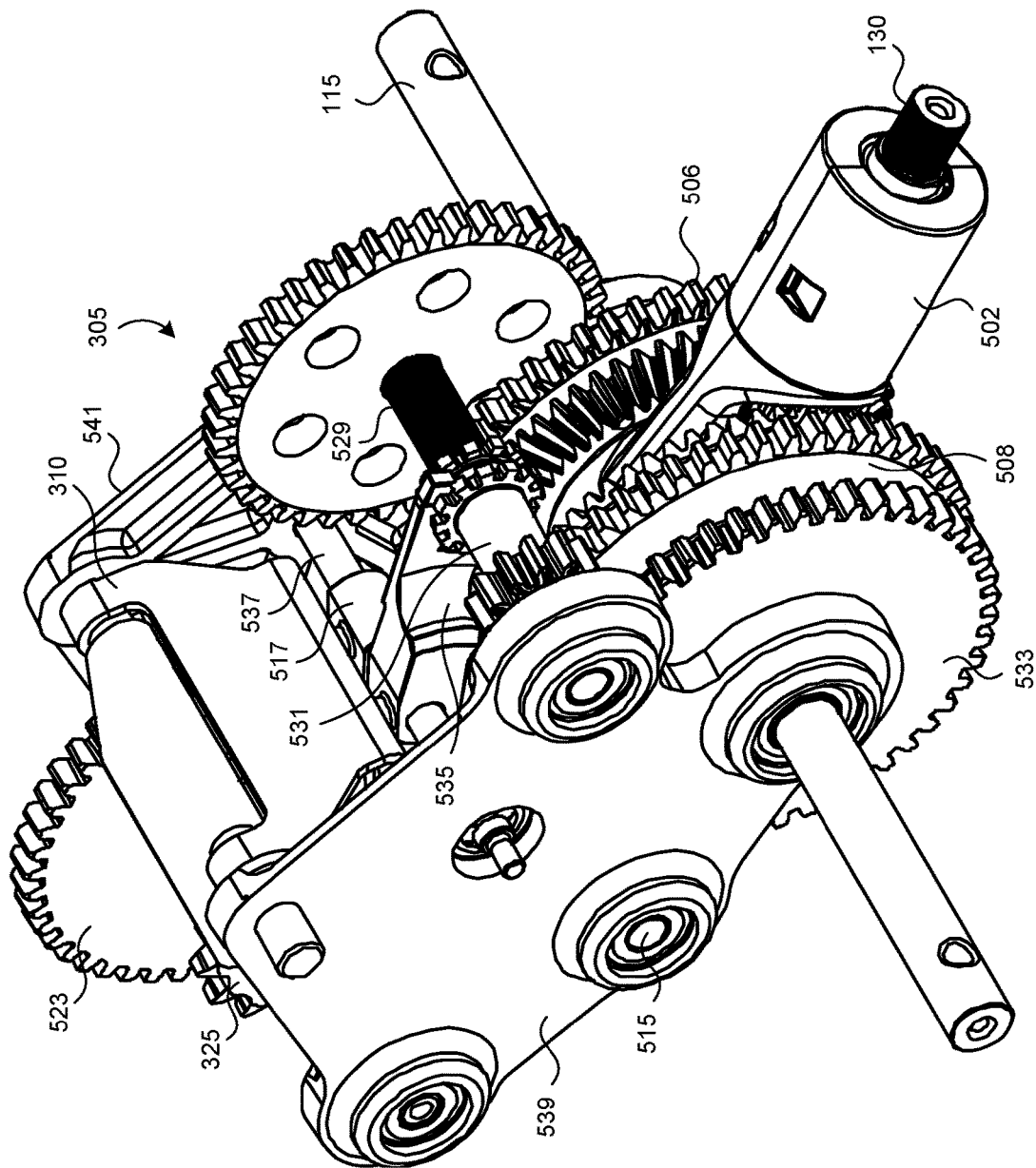
FIG. 4 illustrates a perspective view of the driveline assembly shown in FIG. 3.
Figure 5:
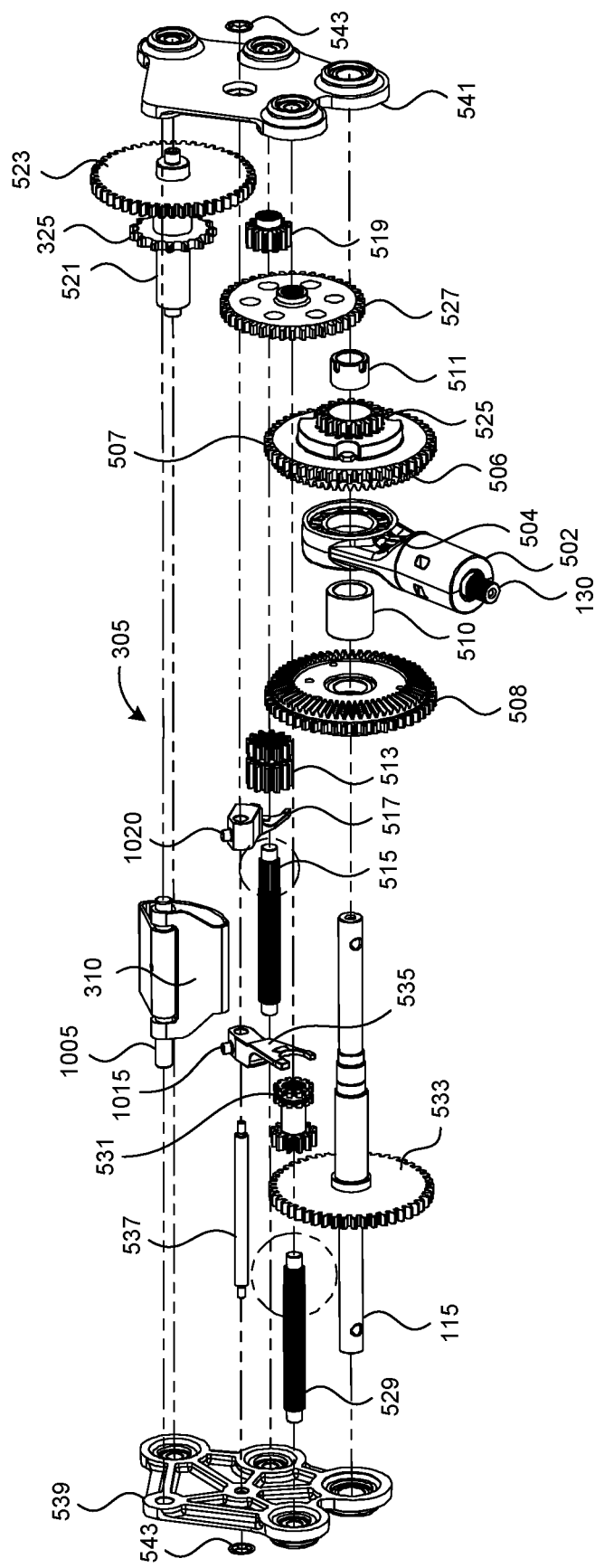
FIG. 5 illustrates an exploded perspective view of the driveline assembly shown in FIGS. 3 and 4.

FIG. 4 illustrates a perspective view of the driveline assembly 305 shown in FIG. 3. FIG. 5 illustrates an exploded perspective view of the driveline assembly 305 shown in FIGS. 3 and 4. Several of the following paragraphs first describe how the driveline assembly 305 facilitates selection of a direction of rotation of the tines 205, followed by a description of how the driveline assembly 305 facilitates selection of whether the wheels 110 are provided with rotational force for propulsion. The direction of rotation of the wheels 110 may be determined by selecting the direction of rotation of input to the input shaft 130. Thus, embodiments of the present technology provide several modes of operation, including CRT mode, SRT mode, neutral tines (no tine rotation), forward propulsion, reverse propulsion, and neutral propulsion (no propulsion).

With reference to FIGS. 4 and 5, the input shaft 130 is positioned in an input assembly 502. The input shaft 130 includes or is attached to a beveled input pinion 504. The input shaft 130 rotates the input pinion 504. A first bevel gear cluster 506 and a second bevel gear cluster 508 are connected to, and rotatable relative to, the input assembly 502. Both bevel gear clusters 506, 508 idle on the wheel shaft 115. For purposes of the present disclosure, a first component idling on a second component includes the first component being rotatable around—and rotatable relative to—the second component. According to embodiments of the present technology, the wheel shaft 115 may extend through both bevel gear clusters 506, 508 as a single wheel shaft such that both wheels 110 always rotate the same speed and direction, while the bevel gear clusters 506, 508 are rotatable relative to the wheel shaft 115. In some embodiments, the input assembly 502 may include bearings to facilitate rotation of the wheel shaft 115 relative to the input assembly 502 (because the wheel shaft 115 passes through the input assembly 502 and the weight of the input assembly 502 may be at least partially supported on the wheel shaft 115).

A spacer 510 and a lock nut 511 may help maintain a coaxial relationship between the gear clusters 506, 508, the input assembly 502, and the wheel shaft 115. In operation, when the input shaft 130 is rotated (for example, by force from the motor 105), the input shaft 130 causes the input pinion 504 to rotate, which, by toothed engagement with the first bevel gear cluster 506, causes the first bevel gear cluster 506 to rotate. Toothed engagement between the input pinion 504 and the second bevel gear cluster 508 causes the second bevel gear cluster 508 to rotate in a direction opposite the rotational direction of the first bevel gear cluster 506. Thus, when the input shaft 130 is rotating, the bevel gear clusters 506, 508 are rotating in opposite directions (i.e., they are counter-rotating). For convenience in understanding their functions, the first bevel gear cluster 506 may be referenced as the SRT bevel gear cluster 506, and the second bevel gear cluster 508 may be referenced as the CRT bevel cluster 508.

When the motor 105 is applying rotational force to the input shaft 130, both bevel gear clusters 506 and 508 rotate (they counter-rotate, in opposite directions relative to each other) via their toothed engagement with the pinion 504. Whether the SRT bevel gear cluster 506 or the CRT bevel gear cluster 508 is selected to provide rotational force that ultimately rotates the tines is determined by a position of a first slider gear 513 (which may be a spur gear and may be called the tine-mode selector gear 513). The tine-mode selector gear 513 is moved along a first splined shaft 515 (which may be called the tine-mode shaft 515) by a tine shift fork 517, which pushes or pulls the tine-mode selector gear 513 along the tine-mode shaft 515 depending on movement of the shift drum 310, which is described in additional detail below. The tine-mode selector gear 513 is either in a neutral position in which it engages neither bevel gear cluster 506, 508, or in a position in which it engages one of the bevel gear clusters 506, 508 via spur gear teeth on the gears 506, 508, 513.

When the tine-mode selector gear 513 is positioned to engage the SRT bevel gear cluster 506, the SRT bevel gear cluster 506 rotates the tine-mode selector gear 513, which rotates the tine-mode shaft 515 (via a splined connection between the tine-mode shaft 515 and the tine-mode selector gear 513). A tine-mode intermediate spur gear 519 is fixed to the tine-mode shaft 515 and rotates the same direction as the tine-mode shaft 515. The tine-mode intermediate spur gear 519 engages a tine input shaft 521 (for example, via a tine input gear 523) to rotate the tine input shaft 521.

The tine output sprocket 325 is mounted to the tine input shaft 521. Thus, the tine output sprocket 325 rotates, and with additional reference to FIG. 3, the tine output sprocket 325 drives the chain 315 and the corresponding tine input sprocket 320 to cause the tines 205 to operate. Accordingly, when the tine-mode selector gear 513 is engaged with the SRT bevel gear cluster 506, the motor 105 is operatively connected to the tines 205, which operate in SRT mode. The relative sizes and numbers of teeth for the gears in the driveline assembly 305 may be selected such that the tines rotate slowly relative to the motor 105. Although SRT bevel gear cluster 506 and CRT bevel gear cluster 508 are referred to as such, in some embodiments, aspects of the driveline may be reversed or they may provide functions other than SRT or CRT.

In some embodiments, the wheels 110 may rotate at approximately 15 to 25 revolutions per minute (RPM), which may provide a suitable (such as optimal) walking speed for the overall tiller 100, dependent upon the diameter of the wheels 110. In other embodiments, the wheels 110 may rotate at higher or lower RPM values. Suitable wheels 110 may have diameters between approximately 12 inches and 16 inches, or other sizes. In some embodiments, a suitable (such as optimal) tine speed is between approximately 150 RPM and 300 RPM, although other speeds may be used, and the optimal speed may depend on the type of tines (for example, thicker and larger tines require more power to move than thinner and smaller tines). In some embodiments, a ratio of the tine speed to the wheel speed may be between 20:1 and 6:1.

The tine-mode selector gear 513 may be positioned (via operation of the shift drum 310 and the tine shift fork 517) to be disengaged from both bevel gear clusters 506, 508. In such a configuration, the tine-mode intermediate spur gear 519 is not provided with rotational force, so the tines 205 are also not provided with rotational force from the motor 105, which may be deemed a neutral mode of the tines.

When the tine-mode selector gear 513 is positioned to engage the CRT bevel gear cluster 508, the tine-mode selector gear 513 receives a rotational force opposite the rotational force it receives when in SRT mode (because the CRT bevel gear cluster 508 rotates opposite the SRT bevel gear cluster 506). Likewise, the tine-mode shaft 515, the tine-mode intermediate spur gear 519, the tine input gear 523, the tine input shaft 521, and the tine output sprocket 325 rotate opposite their corresponding rotational directions, thereby causing the chain 315 and the tine input sprocket 320 to rotate opposite from SRT mode. Accordingly, the tine-mode selector gear 513 may be positioned to cause the tines 205 to operate in one direction or another, such as CRT mode or SRT mode, or the tine-mode selector gear 513 may be positioned to disengage from the bevel gear clusters 506, 508 such that the tines 205 are not driven (tine-neutral mode). The position of the tine-mode selector gear 513 may be determined by the shift drum 310, which is described in additional detail below.

Several of the foregoing paragraphs describe the manner in which the driveline assembly 305 facilitates selection of the rotational direction of the tines 205. The driveline assembly 305 also facilitates selection of whether the wheels 110 are driven or undriven (neutral).

As described above, the input shaft 130 rotates the first bevel gear cluster 506 (which may be referred to as the SRT bevel gear cluster 506). In addition to bevel teeth for engaging the pinion 504 and spur gear teeth 507 for engaging the tine-mode intermediate spur gear 519 to drive the tines in SRT mode, the first bevel gear cluster 506 further includes spur gear teeth 525 for engaging a drive-mode intermediate spur gear 527. The spur gear teeth 525 may be carried on a separate gear attached to the first bevel gear cluster 506 or they may be integral to the first bevel gear cluster 506.

The drive-mode intermediate spur gear 527 is fixed to a drive-mode shaft 529 and rotates with the drive-mode shaft 529 (for example, via a splined connection or another suitable fixed connection). The drive-mode shaft 529 carries a second slider gear 531 (which may include a spur gear and may be called the drive-mode selector gear 531), which also rotates with the drive-mode shaft 529 but may slide along the drive-mode shaft 529. Accordingly, when the input shaft 130 is rotating, the drive-mode selector gear 531 is also rotating.

Whether the wheels 110 are driven or undriven depends, therefore, on the position of the drive-mode selector gear 531 along the drive-mode shaft 529. The drive-mode selector gear 531 may be positioned to engage a wheel drive gear 533 (which may be in the form of a spur gear) mounted to the wheel shaft 115, or it may be positioned to disengage from the wheel drive gear 533. When the drive-mode selector gear 531 engages the wheel drive gear 533, and the input shaft 130 is receiving input force from the motor, the input force is transferred to the wheel shaft 115 to rotate the wheels to propel the tiller 100. When the drive-mode selector gear 531 is in a position to be disengaged from the wheel drive gear 533, the wheels are free to rotate and are not driven (i.e., wheel neutral mode).

According to embodiments of the present technology, disengaging the wheel drive gear 533 disengages the wheels 110 from the remainder of the driveline assembly 305, which results in a tiller 100 that is maneuverable due to minimal rolling resistance and due to the remainder of the driveline assembly 305 not being backdriven when the tiller 100 is moved in the wheel neutral mode. This is in contrast to existing technologies that include a wheel shaft driven by a chain and sprocket—in such existing technologies there is added friction during wheel neutral mode from the chain and sprocket that is avoided by embodiments of the present technology.

Whether one or more teeth of the drive-mode selector gear 531 are engaged with one or more teeth of the wheel drive gear 533 depends on the position of the drive-mode selector gear 531, which is controlled by a wheel selector fork 535 and the shift drum 310 in a manner similar to control of the tine-mode selector gear 513 (described above). Specifically, movement of the shift drum 310 causes the wheel selector fork 535 to slide along a rod 537 (similarly, movement of the shift drum 310 causes the tine shift fork 517 to slide along the rod 537). As the wheel selector fork 535 moves, it pushes or pulls the drive-mode selector gear 531 along the drive-mode shaft 529 between a first position in which the motor is operatively connected to the wheels (via the drive-mode selector gear 531 engaging the wheel drive gear 533) and a second position in which the motor is disconnected from the wheels.

In some embodiments, components of the driveline assembly 305 may be supported by support elements, such that the driveline assembly 305 forms a discrete subassembly that is removable and replaceable within the tiller 100 or installed as a component during manufacture. In other embodiments, components of the driveline assembly 305 may be supported directly by structure of the tiller 100.

FIGS. 4 and 5 illustrate a driveline assembly 305 supported by support elements in the form of bearing blocks 539, 541, although in other embodiments, the bearing blocks 539, 541 may be integrated into other components of a tiller 100, such as a frame or housing. The bearing blocks 539, 541 provide bearing surfaces (with or without ball bearing assemblies) for the rotation of several of the rotational components of the driveline assembly 305, including the tine input shaft 521, the shift drum 310, the drive-mode shaft 529, the tine-mode shaft 515, and the wheel shaft 115. The bearing blocks 539, 541 may also support components that do not rotate, such as the rod 537, which may function as a tie rod holding the bearing blocks 539, 541 together. For example, threaded nuts 543 may engage threaded ends of the rod 537.

Figure 6:
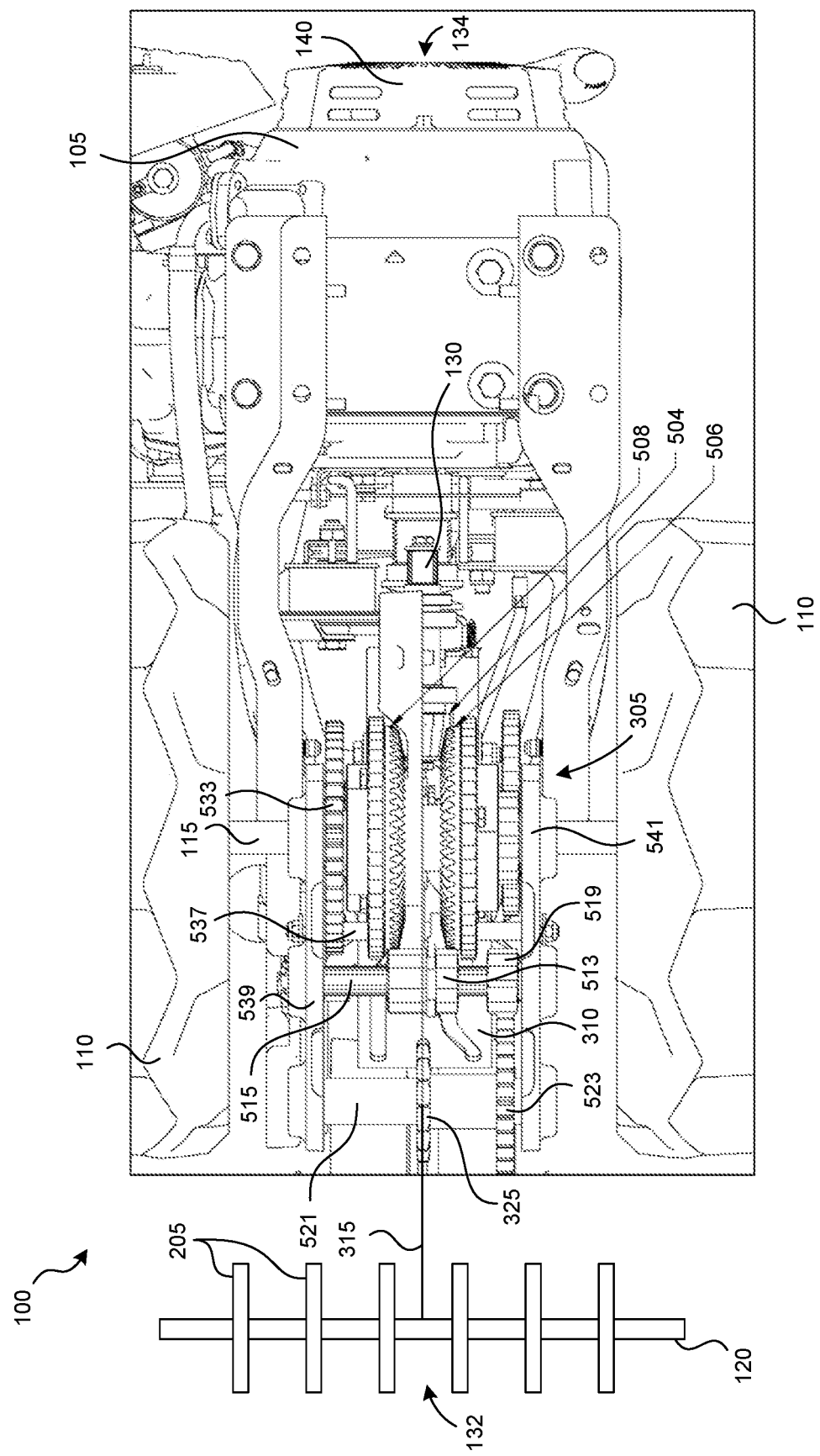
FIG. 6 is a schematic bottom view of the tiller illustrated in FIG. 1, showing components of the driveline.

FIG. 6 is a schematic bottom view of the tiller 100 illustrated in FIG. 1, showing components of the driveline assembly 305. With continued reference to FIGS. 1-6, the driveline assembly 305 provides a configuration that positions the center of gravity 200 (see FIG. 2) of the tiller 100 above the wheel shaft 115 and closer to the forward (motor) side 134 of the tiller 100, while using the wheel shaft 115 as a fulcrum point, all of which contributes to generally balanced forward to rearward weight distribution relative to the wheel shaft 115 and improved maneuverability relative to existing technologies.

The driveline assembly 305 may also provide reduced weight overall relative to existing configurations (at least in part because the driveline assembly 305 facilitates omission of weights used in existing machines to attempt to balance them), which may reduce manufacturing and shipping costs. According to embodiments of the present technology, most or all of the heaviest parts of the tiller 100 are stacked (i.e., coaxial) on the wheel shaft 115 or are positioned forward in the engine (i.e., the engine's flywheel 140), which enhances the user experience by putting more weight on the traction elements (the propulsion system, such as wheels 110) and reducing the weight experienced by the user.

Driveline assemblies 305 configured in accordance with embodiments of the present technology may use a single beveled input pinion 504 to drive the bevel gear clusters 506, 508. The dual-gear rotation provided by the bevel gear clusters 506, 508 facilitates selection between CRT mode and SRT mode. A unique aspect of driveline assemblies configured in accordance with embodiments of the present technology is that the bevel gear clusters 506, 508 idle on the wheel shaft 115 while counter-rotating relative to each other. Arrangements according to the present technology may not include a reversing lay shaft because a reversing lay shaft is unnecessary.

Because the bevel gear clusters 506, 508 idle on the wheel shaft 115, the wheel shaft 115 has a variable rotational velocity relative to both bevel gear clusters 506, 508, which may rotate at different speeds or in different directions relative to the wheel shaft 115. The wheel shaft 115 may rotate at a different (such as slower) rate than either bevel gear cluster 506, 508 (for example, due to the gear ratios between the SRT bevel gear cluster 506, the drive-mode intermediate spur gear 527, and the drive-mode selector gear 531), which contributes to providing a comfortable walking speed for a user while also providing sufficient tilling speed (via the gear ratios in the gear train from the bevel gear clusters 506, 508, depending on which is selected, to the tine output sprocket 325, via the intermediate connections including the tine-mode selector gear 513, the tine-mode intermediate spur gear 519, and the tine input gear 523).

Figure 7:
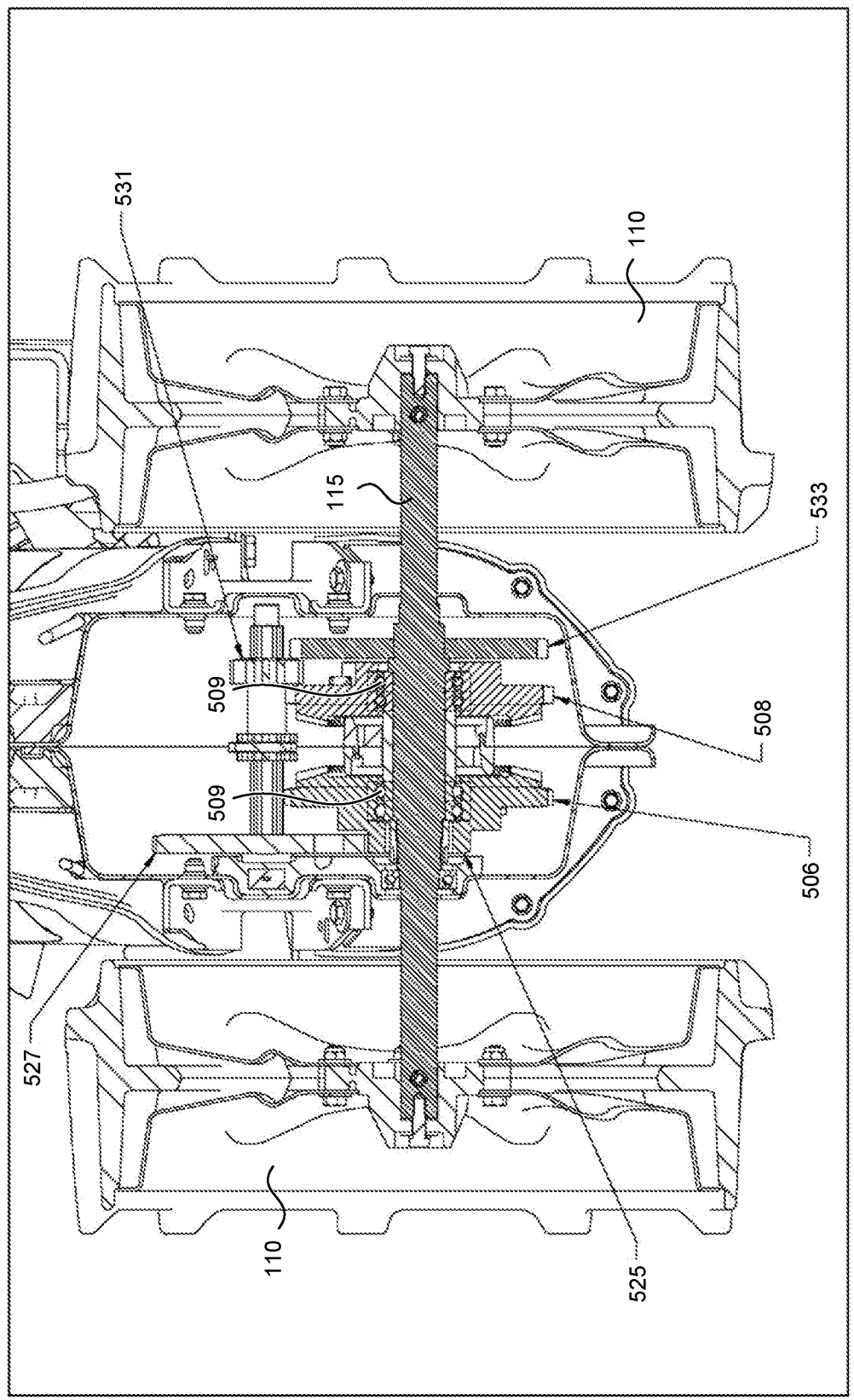
FIG. 7 is a partially schematic, cross-sectional rear view of the tiller shown in FIG. 1.

FIG. 7 is a partially schematic, cross-sectional rear view of the tiller 100 shown in FIG. 1. The wheel drive gear 533 may be fastened to the wheel shaft 115 in any manner suitable for facilitating transfer of rotation from the wheel drive gear 533 to the wheel shaft 115, such as via welding, fasteners, a splined connection, or other suitable manners of attachment. In some embodiments, the bevel gear clusters 506, 508 may include optional roller bearings 509 for facilitating idling of the bevel gear clusters 506, 508 on the wheel shaft 115 (i.e., rotation of the bevel gear clusters 506, 508 relative to the wheel shaft 115).

Figure 8:
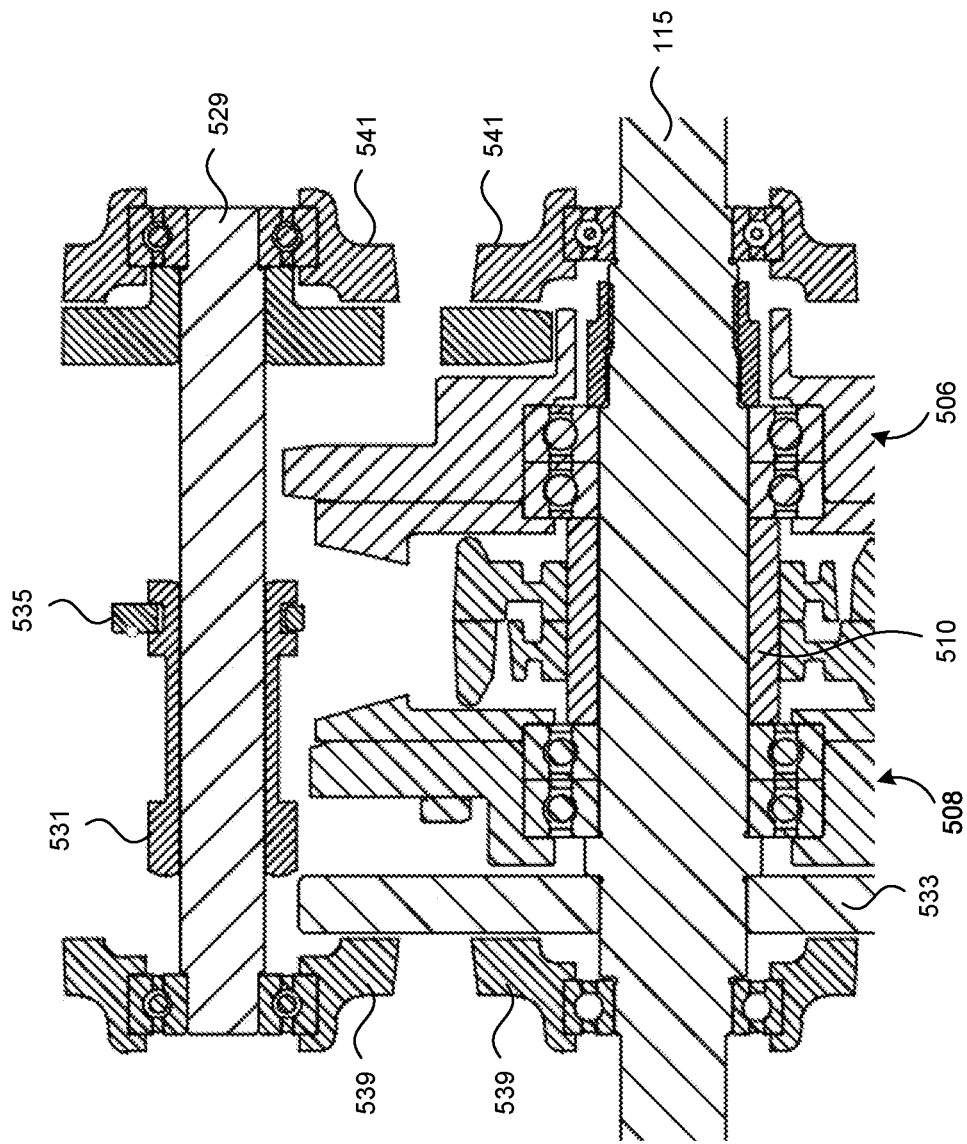
FIG. 8 is a partially schematic view of a portion of the driveline shown in FIGS. 3-7, illustrating the drive-mode selector gear having been moved by the wheel selector fork such that the drive-mode selector gear is not engaged with the wheel drive gear.

FIG. 8 is a partially schematic view of a portion of the driveline assembly 305 shown in FIGS. 3-7, illustrating the drive-mode selector gear 531 having been moved by the wheel selector fork 535 such that the drive-mode selector gear 531 is not engaged with the wheel drive gear 533. In such a configuration, the wheels are in neutral, non-driven mode, and may be free to roll (unpowered). Movement of the tine-mode selector gear 513 relative to the bevel gear clusters 506, 508 (to engage or disengage one or the other bevel gear cluster) may be similar to the movement of the drive-mode selector gear 531. For example, each of the selector gears 531, 513 may include circumferential slots or grooves to receive their corresponding forks 535, 517.

Shift Drum

Figure 9:
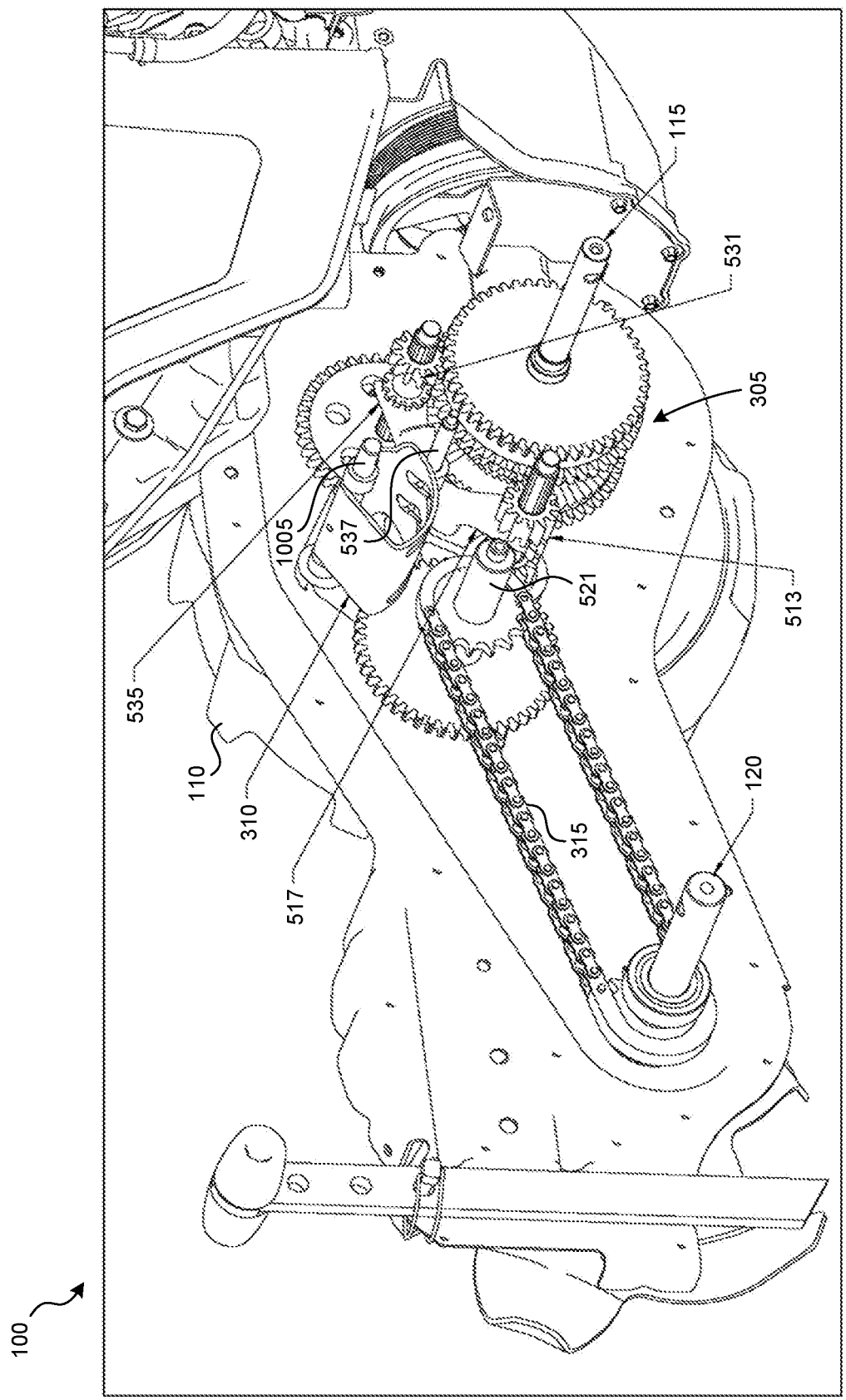
FIG. 9 is a partially schematic perspective view of portions of the driveline shown in FIGS. 3-7, positioned in the tiller.

FIG. 9 is a partially schematic perspective view of portions of the tiller's driveline assembly 305 shown in FIGS. 3-7. In particular, FIG. 9 shows a representative location of a shift drum 310 within the tiller according to embodiments of the present technology.

For context, the sequential shift pattern in existing DDT rear-tine tiller/cultivators uses one shift fork to move one shifting gear into the five different modes of operation described in the background section above. In contrast, in some embodiments of the present technology, two shift forks may be used (one for each slider gear 513, 531) to facilitate selection of the various operating modes. In addition, positioning a majority of the gears on or near the wheel shaft (which provides several advantages, as described above, such as improving weight and balance of the machine) may result in a need for two shift forks (for example, if a user desires propulsion control in addition to tine control with the same shift handle or other shifting interface). Using two shift forks may necessitate two shift grooves to control the shift forks.

Figure 11:
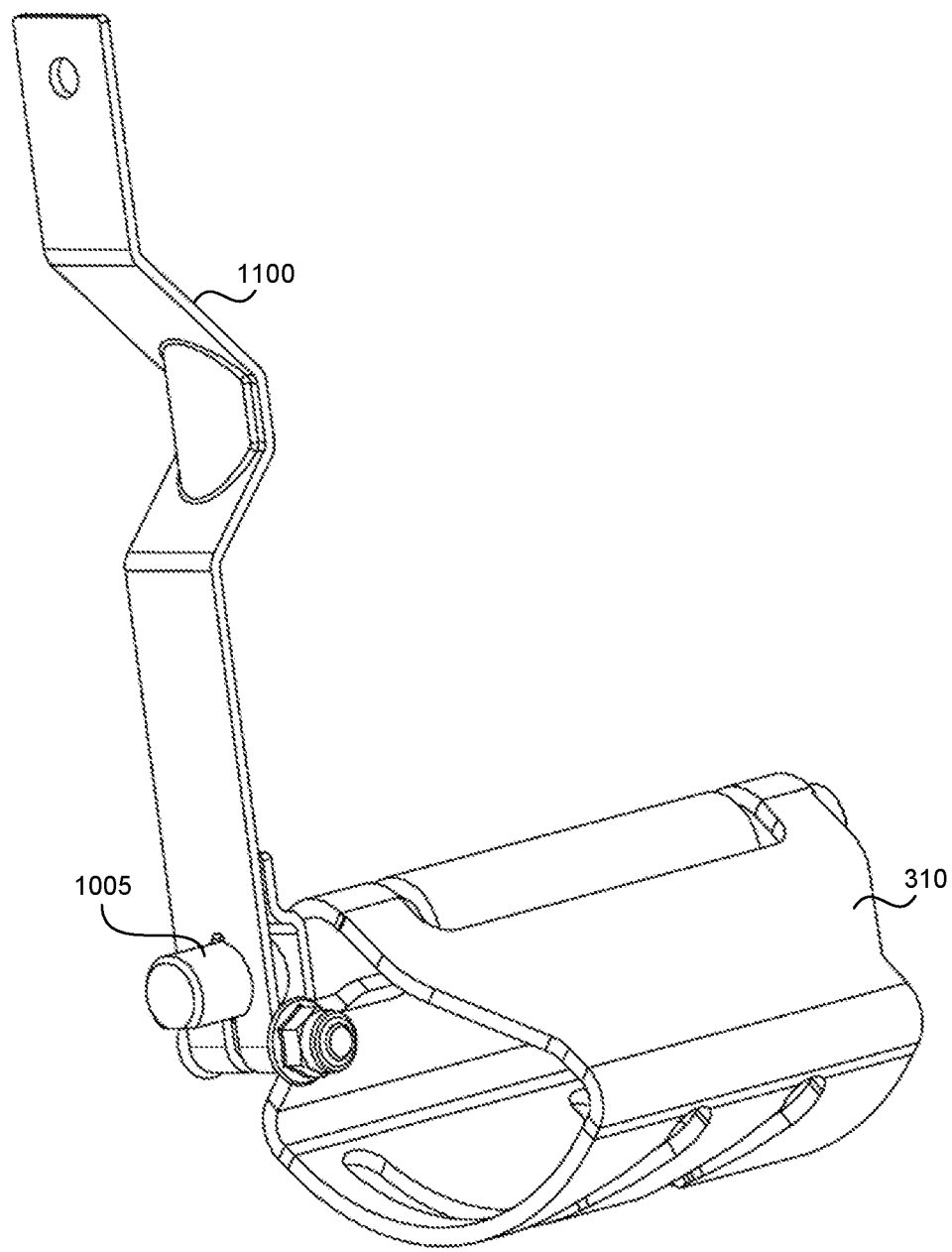
FIG. 11 illustrates a lever attached to a shift drum in accordance with embodiments of the present technology.

Due to packaging constraints outside of the driveline assembly 305, a user-operable shift lever for controlling modes of a DDT tiller/cultivator may only have space to be movable a small distance from one mode to another (see FIG. 11). Specifically, in some embodiments, there may be only a small area to actuate the shift lever connected to the shift drum 310 to actuate the shift forks 517, 535. A shift drum 310 configured in accordance with embodiments of the present technology facilitates movement among several modes of operation (for example, four modes) while operating the shift lever through a range of approximately 90 degrees or less (i.e., the shifter need only move within a range of a maximum of 90 degrees in some embodiments, or less in other embodiments, to access all modes). In some embodiments, the shift lever may be configured to move through a range of approximately 180 degrees or less. As explained in additional detail above, in some embodiments, the present technology provides reverse wheel movement via reversing the input to the input shaft 130.

Figure 10A:
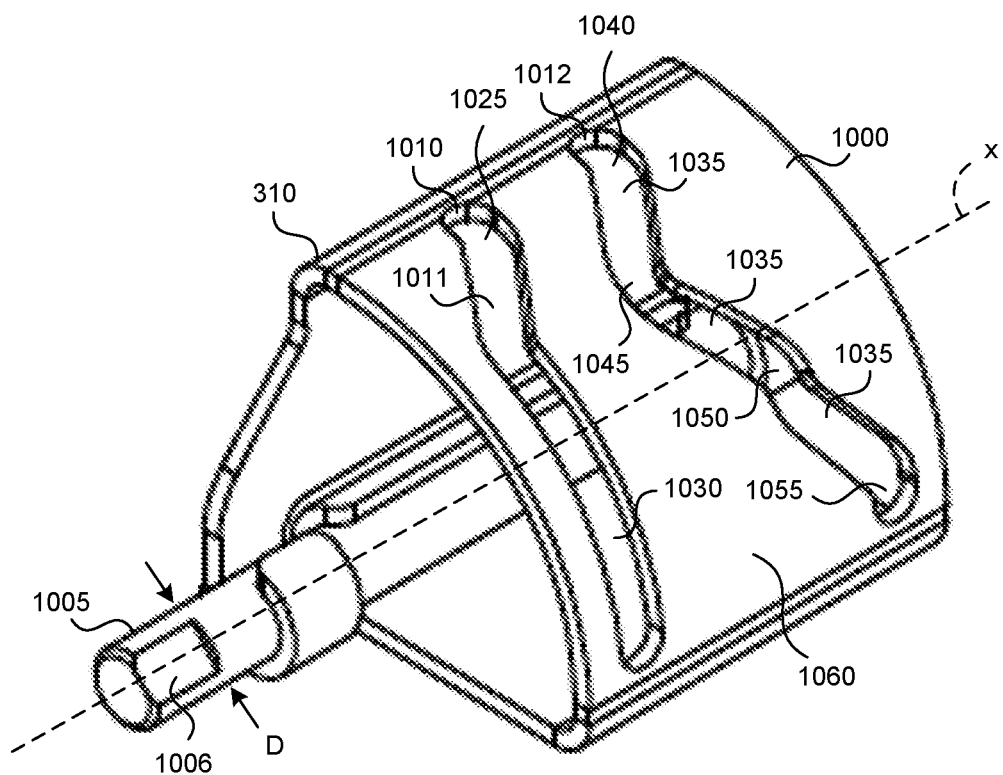
FIGS. 10A and 10B illustrate perspective views of a shift drum configured in accordance with embodiments of the present technology.
Figure 10B:
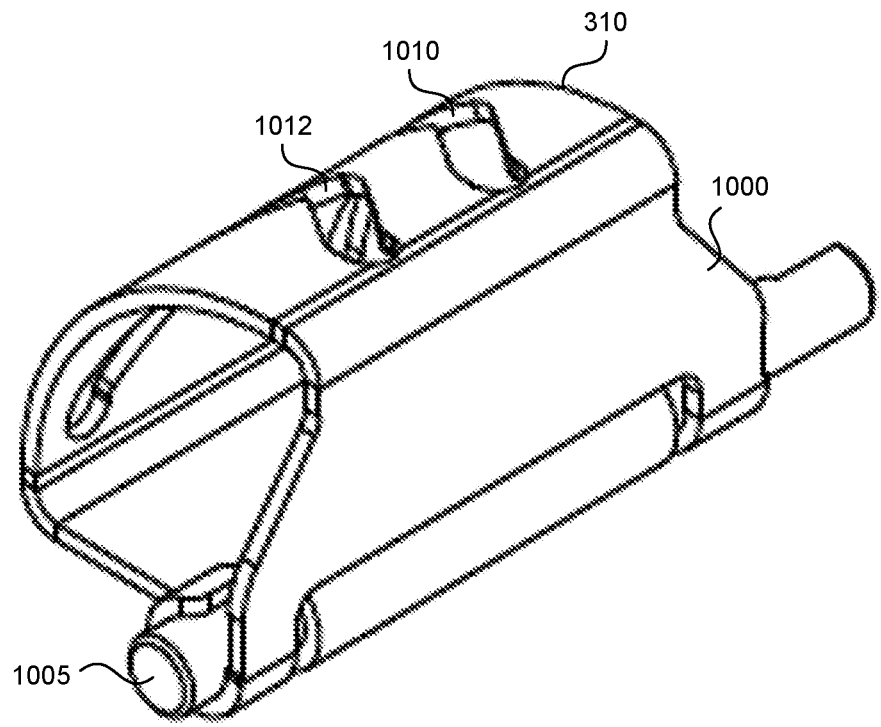

FIGS. 10A and 10B illustrate perspective views of a shift drum 310 configured in accordance with embodiments of the present technology. In contrast with conventional shift drums, which are generally cylindrical and often formed from a solid piece of bar stock or cast or billet material, the shift drum 310 may include a curved sheet portion 1000 (which may be formed with sheet metal) attached to a rod portion 1005 (attached with welding or fasteners, or one or more other suitable attachments). In some embodiments, sheet metal may be bent into a fan shape (for example, not a full cylinder) to form a rounded surface illustrated in FIGS. 10A and 10B before or after cutting shift grooves 1010, 1012 into the sheet portion 1000, and the formed sheet portion 1000 may then be attached to the rod portion 1005. Accordingly, construction of the shift drum 310 may be less complicated and less costly than shift drums in other transmissions, and the shift drum 310 may weigh less than other shift drums. With reference to FIG. 5, the rod portion 1005 may be positioned in the bearing blocks 539, 541 so the drum 310 pivots about the axis x of the rod portion 1005.

The shift grooves 1010, 1012 on the rounded surface of the shift drum 310 engage projections 1015, 1020 on the shift forks 535, 517 (see FIG. 5, for example) by receiving the projections 1015, 1020 in the grooves 1010, 1012. For example, the projection 1015 of the wheel selector fork 535 slides within the wheel selector groove 1010, and the projection 1020 of the tine shift fork 517 slides in the tine selector groove 1012. As the shift drum 310 rotates about the axis x, the grooves 1010, 1012 push the projections 1015, 1020, which cause the forks 535, 517 to slide on the rod 537 (see FIG. 5, for example), which in turn push the respective gears 531, 513 into or out of engagement with their corresponding respective gears 533, 508, and/or 506 (as described above with regard to FIG. 5, for example). In some embodiments, the rod portion 1005 of the shift drum 310 may include a flattened surface 1006 or other surface (such as a splined surface) for providing an area or surface for an operating handle to engage with the rod portion 1005 in order to deliver torque to the shift drum 310 to cause it to rotate to change the tiller between modes (in other embodiments, a handle may be attached with welding, adhesive, fasteners, or other suitable means of attachment).

In some embodiments, the wheel selector groove 1010 has two functional positions 1025, 1030. For the sake of convenience, transitional positions 1011 between the two functional positions are not explained in detail (the transitional positions 1011 are positions of the projection 1015 between functions, in which the projection 1015 is partially engaged between one or both of the two functional positions or not engaged with either functional position). When the projection 1015 is in a first position 1025, the drive-mode selector gear 531 is disengaged from the wheel drive gear 533 (see FIGS. 4, 5), and the tiller is in a neutral mode, such that the wheels (via wheel shaft 115) do not receive rotational force. When the shift drum 310 is rotated to position the projection 1015 in the longer slot generally indicated by position 1030, the drive-mode selector gear 531 engages the wheel drive gear 533 to apply rotational force to the wheels. Thus, the wheel selector groove 1010 provides two modes: powered wheels or unpowered (neutral) wheels.

In some embodiments, the tine selector groove 1012 has four functional positions 1040, 1045, 1050, 1055. For the sake of convenience, transitional positions 1035 between each two adjacent main positions are not explained in detail (the transitional positions 1035 are positions of the projection 1020 between functions, in which the projection 1020 is partially engaged between one or both of two adjacent main functional positions or not engaged with any functional position). When the projection 1020 of the tine shift fork 517 is in a first position 1040, the tine-mode selector gear 513 is disengaged from both bevel gear clusters 506, 508, and the tines are unpowered (a neutral mode). When the drum 310 rotates to slide the projection 1020 into a second position 1045, the tine-mode selector gear 513 engages the CRT bevel cluster 508 to cause the tines to rotate opposite the direction of the rotation of the wheels (which are powered in this position of the shift drum 310 due to the projection 1015 being in position 1030). When the drum 310 rotates to slide the projection 1020 into a third position 1050, the tine-mode selector gear 513 disengages the CRT bevel cluster 508 and is not engaged with the SRT bevel cluster 506, such that the tines do not receive rotational force and only the wheels 110 are powered (wheels moving, tines neutral). When the drum 310 rotates to slide the projection 1020 into a fourth position 1055, the tine-mode selector gear 513 engages the SRT bevel cluster 506 and is not engaged with the CRT bevel cluster 508, such that the tines rotate the same direction as the wheels (which are powered in this position of the shift drum 310 due to the projection 1015 being in position 1030).

Accordingly, the shift drum 310 provides four modes as the shift drum 310 rotates and moves the shift forks 535, 517: (1) wheels neutral, tines neutral; (2) wheels powered, tines rotating opposite wheels; (3) wheels powered, tines neutral; (4) wheels powered, tines rotating same direction as wheels. Each mode may be reversed if the input to the input shaft 130 is reversed, as explained above. Thus, the driveline provides DDT functionality for a tiller.

Although two grooves are illustrated and have functions and positions described herein, such functions and positions are only representative functions and positions. Shift drums configured in accordance with embodiments of the present technology may include more or fewer grooves with more or fewer positions to manipulate shift forks and gears in other drivelines or transmissions. For example, positions may be reversed to reverse the order of CRT mode or SRT mode, or shift drums may be implemented in machines other than tillers.

One consideration for shift drums is the angle between the groove and the axis of rotation. If a groove traverses a surface of a shift drum circumferentially or otherwise perpendicular to the axis of rotation, relatively very little force is required to move the shift drum because the resistance (such as friction) between the groove and the shift fork projection is minimized. Conversely, if a groove is nearly parallel to the axis of rotation of the shift drum, significantly more force is required to rotate the shift drum (making rotation impossible if the groove is aligned with the axis of rotation). Accordingly, grooves that cause the projections to move in directions that are as close as reasonably possible to perpendicular to the axis of rotation are desirable, while still causing movement of the shift forks.

One challenge for shift drums is that a relatively high-torque motor often calls for larger gear faces (relative to motors with less torque output), which further calls for larger shift throws between gears. But when shift drums have small circumferences, and the shift forks must move a lot (for example, to traverse a large gear face or several shift positions), the shift grooves must be closer to parallel ("steeper") with the rotational axis in order to move the shift forks the relatively longer distances. In such circumstances, shifting may require a lot of force to overcome resistance due to the steep shift grooves. Conversely, a large shift drum may be required to reduce the resistance. Large shift drums may be weight and/or space-inefficient.

Shift drums configured in accordance with embodiments of the present technology have relatively shallow shift angles, providing less resistance to rotation of the shift drum while moving the shift forks as required. At the same time, shift drums configured in accordance with embodiments of the present technology do not require rotation through large rotation angles (as explained above).

Shift drums configured in accordance with embodiments of the present technology accomplish the features of small rotation angles with sufficient movement of shift forks and reduced friction due to their large surface areas, for example.

Figure 10C:
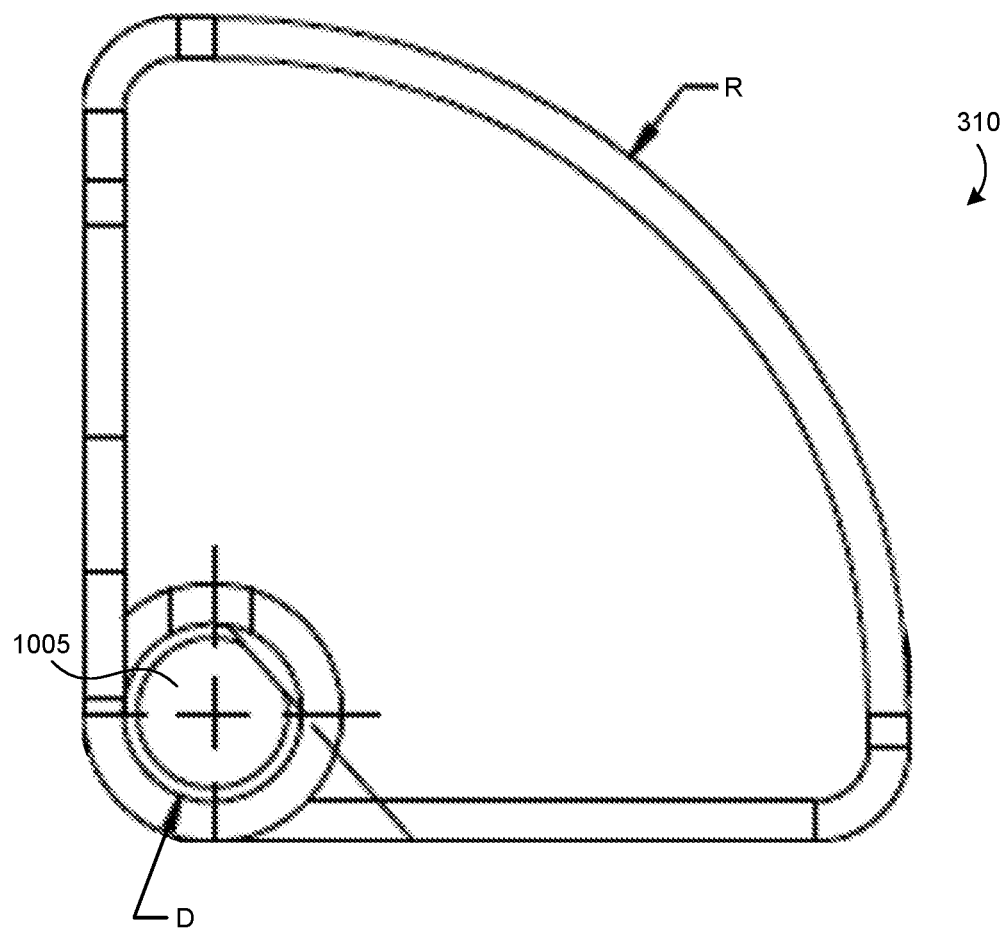
FIG. 10C illustrates a side schematic view of the shift drum shown in FIGS. 10A and 10B.

FIG. 10C illustrates a side schematic view of the shift drum 310, configured in accordance with embodiments of the present technology. In some embodiments, the shift drum 310 includes an enlarged shift drum radius R relative to the diameter D of the pivot shaft rod portion 1005. In general, in some embodiments, the circumference of the pivot shaft rod portion 1005 is less than the shift drum 310 radius R. With additional reference to FIGS. 10A and 10B, such a configuration facilitates large motion of the surface 1060 of the shift drum 310 with relatively little rotation of the pivot shaft rod portion 1005, which allows a lever (see FIG. 11) to move only a small amount (such as within a range of less than 180 degrees, or less than 90 degrees, as described above in additional detail) while still facilitating movement of the shift forks, because the large motion of the surface 1060 allows for shallower angles of the grooves 1010, 1012 (see FIGS. 10A, 10B).

In a particular example, a shift drum radius R may be 51 mm, while a corresponding pivot shaft 1005 diameter D may be 13 mm, resulting in a circumference of the pivot shaft 1005 of approximately 40.82 mm, which is less than the shift drum radius R of 51.00 mm. Different dimensions may be used, and embodiments of the present technology may implement various relative relationships between the shift drum radius R and the diameter D of the pivot shaft rod portion 1005. For example, in some embodiments, the shift drum radius R may be equal to or greater than the circumference of the shaft rod portion 1005. The shift drum radius R may be two or more times (such as three or more times) the radius (D/2) of the shaft rod portion 1005. For example, with additional reference to FIG. 10A, the rounded surface of the sheet portion 1000 (i.e., the surface with grooves 1010, 1012) may extend a radial distance from a pivot axis x of the shift drum 310 that is three or more times a radius of the rod portion 1005.

In general, shift drums configured in accordance with embodiments of the present technology have a large peripheral radius compared to the shaft that supports it, to create a large surface area 1060 with reduced weight and with reduced angular rotation to accomplish shifts of the driveline. Shift drums configured in accordance with embodiments of the present technology provide circumferential travel of the surface 1060 of the shift drum 310 that is sufficient to accomplish four shift modes (via positioning and engagement between the shift drum grooves, such as grooves 1010, 1012 and corresponding shift forks, such as forks 535, 517), while the shift grooves maintain reasonable shift angles to facilitate reasonable shift force. In some embodiments of the present technology, all four shift modes may be accomplished within 90 degrees of rotation of the shift drum, which is operated by an engagement lever connected to the pivot shaft (such as the rod portion 1005). In other embodiments, all four shift modes may be accomplished within 180 degrees of rotation of the shift drum.

Shift drums configured in accordance with embodiments of the present technology are different from existing shift drums for a variety of reasons. For example, existing shift drums generally need to fit in small spaces, such that they are generally not larger than a few inches in diameter (such as a one-inch radius). If an existing shift drum (such as a motorcycle shift drum) were modified to meet the relative size arrangement of the present technology, the shift drum diameter could potentially be larger than the engine flywheel diameter. The flywheel is typically the largest circular element in an engine, so the engine would be increased in size and weight. Accordingly, embodiments of the present technology help reduce size and weight in the engine and transmission to achieve a balanced tiller/cultivator. Further, a motorcycle shifter incorporates a cylindrical shift drum that rotates nearly 360 degrees (for example, in 60 degree increments for a five-speed motorcycle with neutral), which requires an elaborate mechanism. In contrast, shift drums configured in accordance with embodiments of the present technology may not have a circular cross-section. As explained in additional detail below, embodiments of the present technology simplify a sequential transmission by simplifying the mechanism and reducing the required angle of travel of the engagement lever that manipulates the shift drum 310.

Lever Fixed to a Shift Drum

FIG. 11 illustrates a lever 1100 attached to the shift drum 310 in accordance with embodiments of the present technology. The lever 1100 is connected to the shift drum 310 in a manner that omits movable linkages between the shift drum 310 and the lever 1100 (such as a direct attachment between the lever 1100 and the shift drum 310). Accordingly, a user may move the lever 1100, which moves the shift drum 310 without relative movement between the lever 1100 and the shift drum 310. The lever 1100 is shown bolted to the rod portion 1005 (near or on the flattened surface 1006, see FIGS. 10A-10C) but, in other embodiments, the lever 1100 may be clamped, welded, glued, integral with the rod portion 1005, or attached in another manner that facilitates a connection between the lever 1100 and the shift drum 310 that does not permit relative movement between the lever 1100 and the shift drum 310.

In contrast with embodiments according to the present disclosure, existing shift drums for sequential transmissions may be moved with a user-operated actuator or lever that facilitates relative movement between the user-operated actuator or lever and the shift drum. For example, some existing sequential shift drums include an actuator or lever that momentarily applies a torque to the conventional shift drum in order to gain the next mode of operation, before releasing the torque, even if pressure is maintained on the lever. A motorcycle operator, for example, depresses the shift lever and actuates the shift drum to rotate a portion of 360 degrees (for example, 60 degrees in a 5-speed motorcycle with neutral). Then the operator lets the lever return to an inactive position at which time the lever can be depressed again or pulled to return to the previous mode. This type of depressing and pulling toggles between various modes (gears) and adds unnecessary complication to sequential transmissions for equipment such as tillers. Accordingly, in contrast, embodiments of the present technology include an actuator or lever that is mechanically attached to the pivot shaft 1005 (rod portion 1005), in a fixed manner, and is not toggled.

CONCLUSION

Embodiments of the present technology balance a tiller or cultivator about its centerline and place the center of gravity close to the wheels, which ultimately improves traction and performance without adding auxiliary weights. While balancing the unit side to side, the gearing is also positioned lower to the ground and closer the drive wheels. By positioning the gearing in this manner, the use of auxiliary weight is not required. The position of the weight affects the wheel traction of a rear-tine tiller/cultivator. Gear arrangements and mechanism arrangements according to embodiments of the present technology improve balance without adding weight and cost in the form of auxiliary weights. Accordingly, embodiments of the present technology may reduce cost relative to existing devices, including existing dual-direction rear-tine machines. A further advantage is that embodiments of the present technology may facilitate positioning of the engine flywheel 140 along the centerline 135 of a tiller 100, opposite the tines, which dampens vibration from the tines that would otherwise be transferred to a user through the handles (see FIG. 1).

From the foregoing, it will be appreciated that specific embodiments of the presently disclosed technology have been described herein for purposes of illustration, but that various modifications may be made without deviating from the scope of the technology. For example, although wheels are referenced for propulsion, in some embodiments, other propulsion systems may be used, such as tracks or rollers. Certain aspects of the technology may be used in electric or gas-powered tiller machines. Although dual-direction, rear-tine tillers/cultivators are described herein, aspects or embodiments of the present technology may be implemented in other tillers/cultivators, such as tillers/cultivators that are not rear-tine or dual-direction.

Although some intermediate gears are described, some may be optional, and more or fewer gears, or larger or smaller gears, may be used. When the term "gears" is used, it is understood that "gears" may include suitable teeth or engagement surfaces to facilitate operative connections between the interconnected parts described herein. In some embodiments, belts or other mechanisms suitable for transferring rotation may be used to transfer rotation between mutually engaged or operatively connected components. Certain aspects of the technology described in the context of particular embodiments may be combined or eliminated in other embodiments.

Further, while advantages associated with certain embodiments of the presently disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A tiller comprising
a motor,
one or more tines carried by a rotatable tine shaft, and
a driveline assembly operatively connecting the motor to the tine shaft, the driveline assembly comprising:
an input shaft connected to the motor, the motor configured to provide rotational force to the input shaft;
a beveled input pinion connected to the input shaft;
a first bevel gear cluster engaged with the beveled input pinion;
a second bevel gear cluster engaged with the beveled input pinion; and
a wheel shaft carrying one or more wheels, wherein the first bevel gear cluster and the second bevel gear cluster each idle on the wheel shaft and wherein the first bevel gear cluster counter-rotates relative to the second bevel gear cluster.

2. The tiller of claim 1 wherein the driveline assembly further comprises a slider gear positioned on a splined shaft, the slider gear being movable among a first position in which the slider gear engages a wheel drive gear on the wheel shaft and a second position in which the slider gear is disengaged from the wheel drive gear, wherein when the slider gear is in the first position and the motor is rotating the input shaft, the wheel shaft is rotated to drive one or more wheels mounted on the wheel shaft, and when the slider gear is in the second position, the wheel shaft rotates independently of the motor.

3. The tiller of claim 2 wherein the driveline assembly comprises a shift fork connected to the slider gear and positioned to move the slider gear among the first and second positions, and wherein the shift fork is connected to a shift drum comprising a shift groove positioned to move the shift fork when the shift drum is rotated.

4. The tiller of claim 1 wherein the driveline assembly further comprises a slider gear positioned on a splined shaft, the slider gear being movable among a first position in which the slider gear engages the first bevel gear cluster, a second position in which the slider gear engages the second bevel gear cluster, and a third position in which the slider gear is not engaged to either the first bevel gear cluster or the second bevel gear cluster.

5. The tiller of claim 4 wherein when the slider gear is engaged with the first bevel gear cluster and the motor is rotating the input shaft, the tine shaft rotates in a first direction, and when the slider gear is engaged with the second bevel gear cluster and the motor is rotating the input shaft, the tine shaft rotates in a second direction opposite the first direction.

6. The tiller of claim 4 wherein the driveline assembly comprises a shift fork connected to the slider gear and positioned to move the slider gear among the first position, the second position, and the third position.

7. The tiller of claim 6 wherein the shift fork is connected to a shift drum, wherein the shift drum comprises a shift groove positioned to move the shift fork when the shift drum is rotated.

8. The tiller of claim 1 wherein a rotational axis of the input shaft and a rotational axis of the wheel shaft are positioned in the same horizontal plane.

9. The tiller of claim 1 wherein a rotational velocity of the wheel shaft is different from a rotational velocity of the first bevel gear and a rotational velocity of the second bevel gear.

10. The tiller of claim 1, comprising one or more user handles positioned on a rear side of the tiller, wherein the motor is positioned on a forward side of the tiller opposite the rear side, the tine shaft is positioned on the rear side, and wherein the wheel shaft is positioned generally between the motor and the tine shaft.

11. The tiller of claim 1 wherein the driveline assembly comprises a shift drum and a lever for actuating the shift drum, wherein the lever is fixed to a shaft of the shift drum in a manner that prevents relative motion between the lever and the shaft of the shift drum and between the lever and the shift drum.

12. A rear-tine tiller comprising:
a motor;
a rotatable tine shaft carrying one or more tines;
a rotatable wheel shaft carrying one or more wheels;
an input shaft connected to the motor, the motor configured to provide rotational force to the input shaft;
a beveled input pinion connected to the input shaft;
a first bevel gear cluster mounted on the wheel shaft, rotatable relative to the wheel shaft, and engaged with the beveled input pinion;
a second bevel gear cluster mounted on the wheel shaft, rotatable relative to the wheel shaft, and engaged with the beveled input pinion, wherein the second bevel gear cluster counter-rotates relative to the first bevel gear cluster; and
a first slider gear positioned on a first splined shaft, the first slider gear being movable among a first position in which the first slider gear engages the first bevel gear cluster, and a second position in which the slider gear engages the second bevel gear cluster, wherein when the first slider gear is engaged with the first bevel gear cluster and the motor is rotating the input shaft, the first bevel gear cluster is operatively connected to the tine shaft and the tine shaft rotates in a first direction, and wherein when the first slider gear is engaged with the second bevel gear cluster and the motor is rotating the input shaft, the second bevel gear cluster is operatively connected to the tine shaft and the tine shaft rotates in a second direction opposite the first direction.

13. The rear-tine tiller of claim 12, further comprising a second slider gear positioned on a second splined shaft, the second slider gear being movable among a first position in which the second slider gear engages a wheel drive gear on the wheel shaft and a second position in which the second slider gear is disengaged from the wheel drive gear, wherein when the second slider gear is in the first position and the motor is rotating the input shaft, the wheel shaft is rotated to drive the one or more wheels, and when the second slider gear is in the second position, the wheel shaft rotates independent of the motor.

14. The rear-tine tiller of claim 13, further comprising:
a first shift fork connected to the first slider gear and positioned to move the first slider gear among the first and second positions of the first slider gear;
a second shift fork connected to the second slider gear and positioned to move the second slider gear among the first and second positions of the second slider gear; and
a shift drum comprising a first shift groove positioned to engage the first shift fork and a second shift groove positioned to engage the second shift fork;
wherein the shift drum is rotatable to move the first shift fork and the second shift fork to move the first slider gear and the second slider gear.

15. The rear-tine tiller of claim 12 wherein the first slider gear is further movable to a third position in which the first slider gear is not engaged to either the first bevel gear cluster or the second bevel gear cluster.

16. A machine comprising:
a first bevel gear supported on a shaft and rotatable about the shaft;
a second bevel gear supported on the shaft and rotatable about the shaft, wherein the second bevel gear counter-rotates relative to the first bevel gear;
a first spur gear movable between a first position in which the first spur gear is engaged with the first bevel gear, and a second position in which the first spur gear is engaged with the second bevel gear; and
a second spur gear movable between a first position in which the second spur gear engages a third spur gear mounted on the shaft, and a second position in which the second spur gear is disengaged from the third spur gear.

17. The machine of claim 16 wherein the machine is a rear-tine tiller and the shaft is a wheel shaft, the machine further comprising a motor, one or more wheels mounted on the wheel shaft, and one or more tines carried on a tine shaft, and wherein:

when the first spur gear is in the first position, the first bevel gear operatively connects the motor to the tine shaft to rotate the tine shaft in a first direction, and when the first spur gear is in the second position, the second bevel gear operatively connects the motor to the tine shaft to rotate the tine shaft in a second direction opposite the first direction.

18. The machine of claim 16, further comprising a shift drum and a shift fork, wherein the shift drum comprises a rod portion and a sheet portion, the sheet portion forming a rounded surface, the sheet portion having a groove positioned to receive a portion of the shift fork, wherein the rounded surface extends a radial distance from a pivot axis of the shift drum that is three or more times a radius of the rod portion.

\* \* \* \* \*